Oct. 17, 1933.  J. M. BARR  1,930,638
THERMAL CONTROLLER
Filed Nov. 19, 1923  4 Sheets-Sheet 1

Inventor:
John M. Barr
By Edwin B. H. Tower Jr.
Atty.

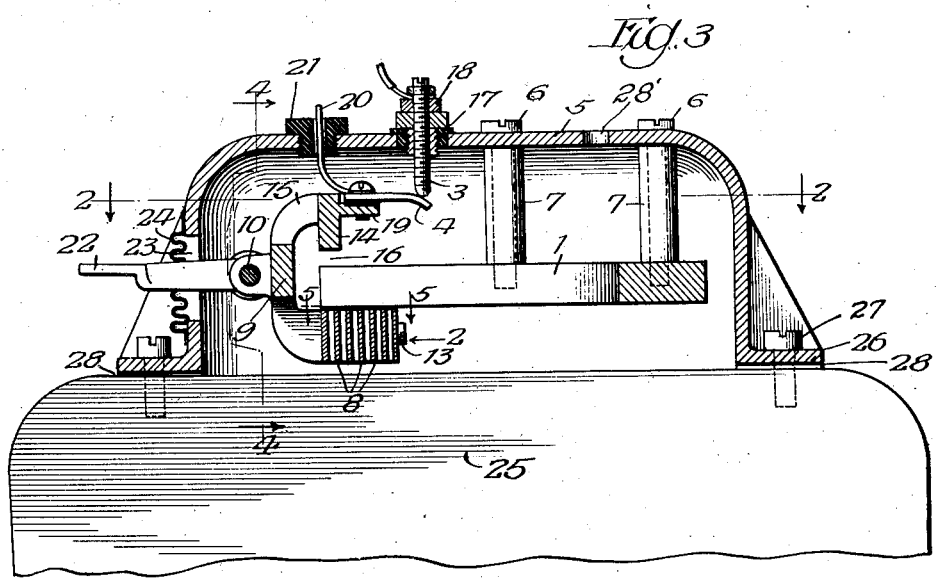
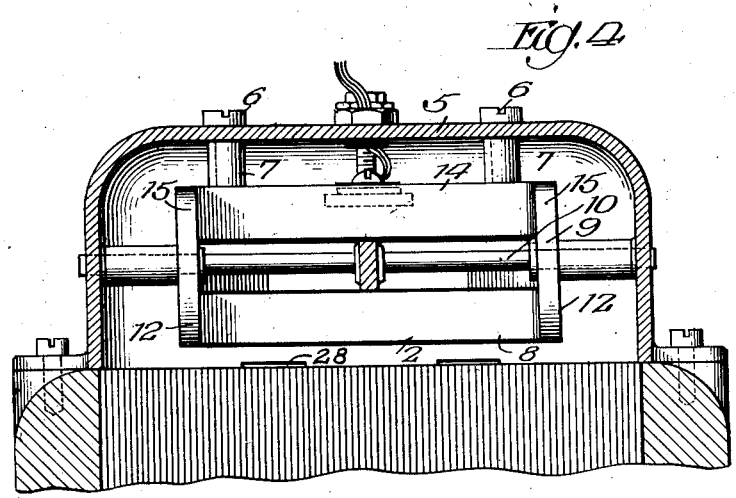
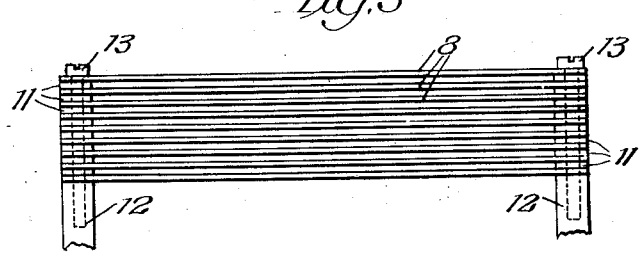

Oct. 17, 1933.  J. M. BARR  1,930,638
THERMAL CONTROLLER
Filed Nov. 19, 1923  4 Sheets-Sheet 3
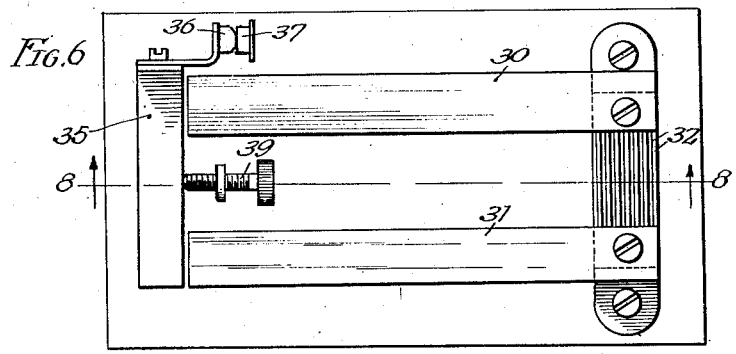
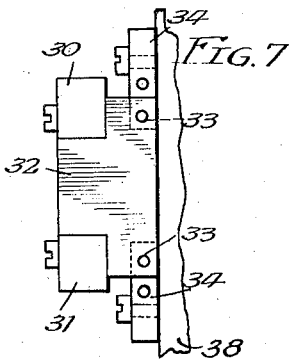
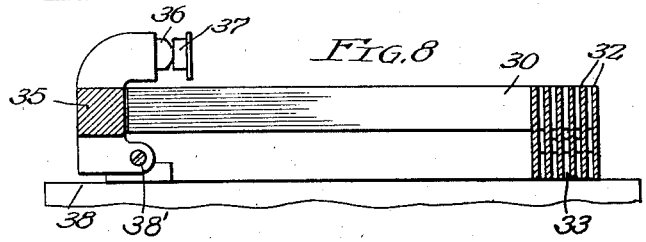
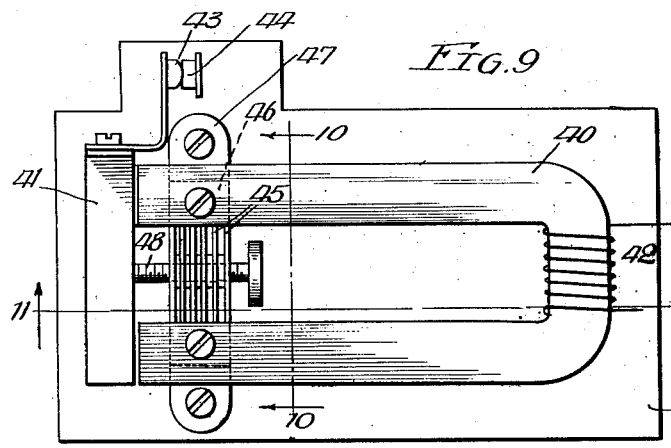
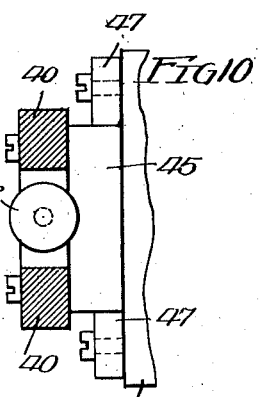
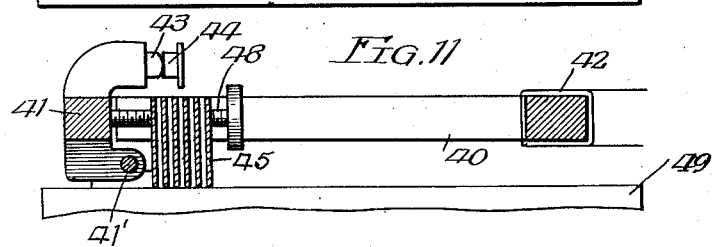
Inventor
John M. Barr
By Edwin B. H. Tower, Jr.
Atty Oct. 17, 1933.  J. M. BARR  1,930,638
THERMAL CONTROLLER
Filed Nov. 19, 1923  4 Sheets-Sheet 4

INVENTOR.
John M. Barr
BY
ATTORNEY

Patented Oct. 17, 1933

1,930,638

UNITED STATES PATENT OFFICE

1,930,638

THERMAL CONTROLLER

John M. Barr, Milwaukee, Wis., assignor to The Louis Allis Company, Milwaukee, Wis., a corporation of Wisconsin Application November 19, 1923
Serial No. 675,635

14 Claims. (Cl. 200—88)

This invention relates to a thermal controller or circuit breaker.

It relates more particularly to a relay having a magnet system including a relatively movable magnet and armature, and contacts controlled thereby.

The characteristics of certain metals and alloys are such that the permeability thereof varies with temperature changes.

In the case of some of such metals and alloys, the permeability change is abrupt and occurs when the temperature reaches a definite value.

Thus Monel metal, nickel steel and other alloys are magnetic when the temperatures thereof are below certain critical values but lose their magnetic properties and become non-magnetic at or above such critical values; while such materials as cobalt are non-magnetic below certain critical temperatures and become magnetic at or above such critical values.

Such materials, the magnetic properties of which abruptly change at certain critical temperatures, may be termed thermomagnetic materials.

An object of the invention is to provide a controller wherein the sensitivity of thermomagnetic material employed therein to temperature changes is utilized to control the contacts thereof.

Another object is to provide a controller wherein actuation of the contacts thereof is determined by the temperature of a part of the magnet system thereof.

Another object is to provide an efficient, rugged and durable controller of few parts, which may be economically manufactured.

Another object is to provide means in a starting circuit of a motor to protect the motor from overheating.

Another object is to provide means in the starting circuit of a motor to prevent the motor from being operated while overheated.

Another object is to provide means in a starting circuit of a motor to stop the motor if started while overheated.

Another object is to provide a starting circuit for a motor which is sensitive to an overload in the current, to an overload in the motor and to a low voltage.

Another object is to provide a starting circuit for a motor which requires the operator to reset a device on the motor before the starting circuit may be placed in operating position.

Other objects and advantages will hereinafter appear.

According to the invention, a controller provided with a relatively movable magnet core and armature, which control the engagement and disengagement of contact members, has a magnetic circuit which includes as a part thereof thermomagnetic material whose temperature controls the operation of the controller.

The views of the drawings are:

Fig. 3 is a vertical section on line 3—3 of Fig. 1.

Fig. 4 is a section on line 4—4 of Fig. 3.

Fig. 5 is a top plan of the controller armature from line 5—5 of Fig. 3.

Fig. 6 is a top plan of a controller having a stationary magnet frame a part of which is made of thermomagnetic material.

Fig. 7 is an elevation of the controller of Fig. 6.

Fig. 8 is a section on line 8—8 of Fig. 6.

Fig. 9 is a top plan of a controller the magnet poles of which are connected by thermomagnetic material.

Fig. 10 is a section on line 10—10 of Fig. 9.

Fig. 11 is a section on line 11—11 of Fig. 9.

Figure 1:
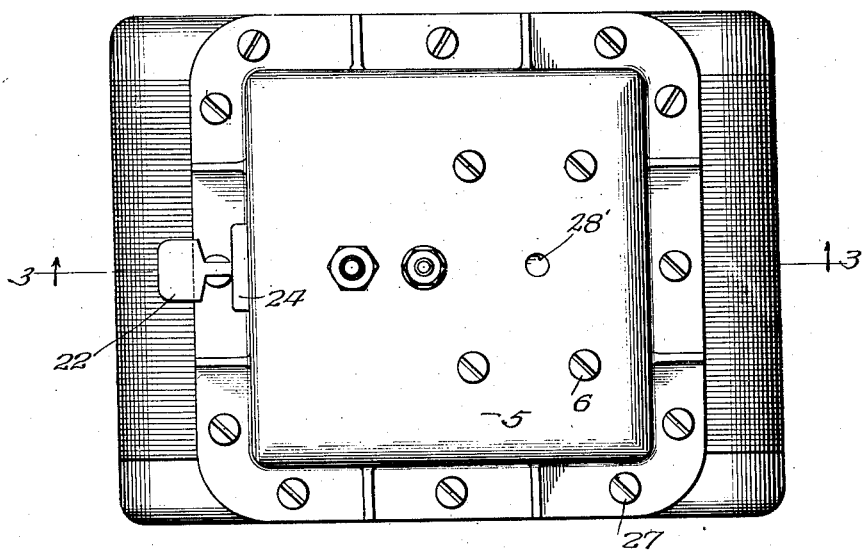
Fig. 1 is a top plan of a controller having an armature of thermomagnetic material.
Figure 2:
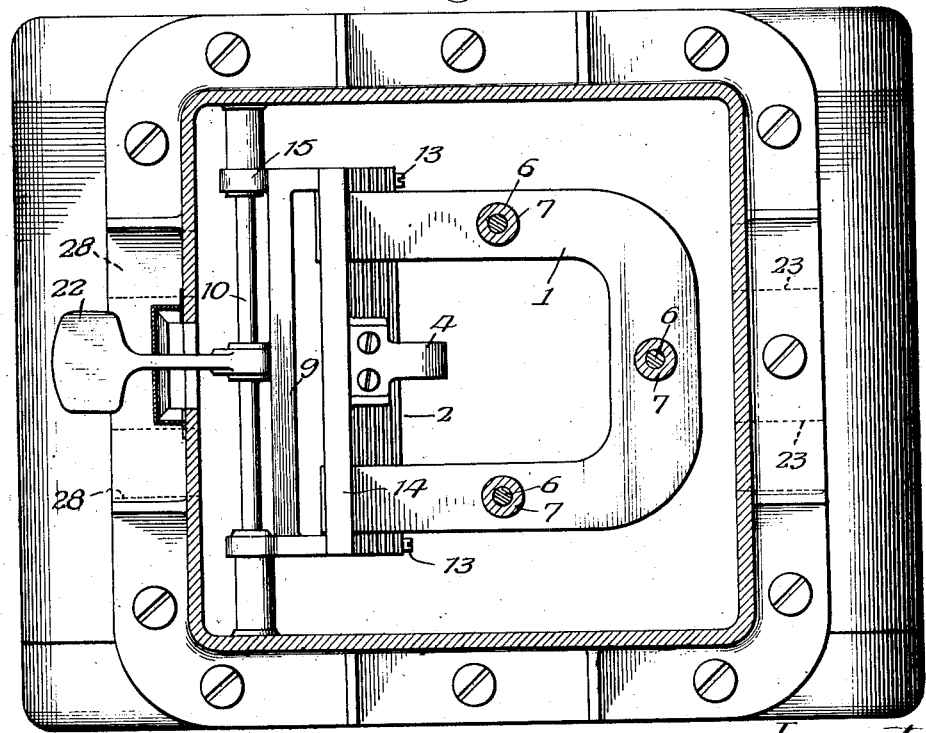
Fig. 2 is a plan section on line 2—2 of Fig. 3.

Figs. 1 to 5 will first be described.

The controller comprises a magnet 1, an armature 2 in operating relation thereto, and relatively movable contacts 3 and 4 controlled by the armature.

The magnet 1, as illustrated, is in the form of a U-shaped permanent magnet although an electromagnet may be employed. The magnet 1 is located within an inverted cup-shaped housing 5 and is supported in spaced relation thereto by bolts 6 surrounded by spacing sleeves 7.

The armature 2 is formed of a plurality of spaced thermomagnetic strips 8. These strips may be made of Monel metal, nickel steel or other material which is magnetic when the temperature thereof is below a critical value but which loses its magnetic property and becomes non-magnetic when its temperature increases to or above such critical value.

The armature 2 is supported in operative relation to the poles of magnet 1 by a yoke 9 carried by a spindle 10 pivoted in opposite walls of the housing 5. The thermomagnetic strips 8 are spaced apart by spacers 11 of similar material and are fastened to the lower yoke arms 12 by bolts 13 or other fastening means.

Normally, when the thermomagnetic armature 2 is in attracted position, as shown in Fig. 3, the temperature thereof is below the critical value.

When the thermomagnetic armature 2 becomes non-magnetic due to increase in temperature thereof to the critical value, the armature, due to the force of gravity, moves away from the poles of magnet 1.

If this armature 2 moves only a short distance away from the poles of the magnet, it may be automatically returned to the position shown in Fig. 3 when it again becomes magnetic due to the decrease in the temperature thereof below the critical value.

In order to insure that the armature 2 will not be automatically restored to its attracted position, a second armature 14 of the usual magnetic material is provided.

This second armature 14 is carried by yoke arms 15 and is normally in spaced relation to the poles of magnet 1.

The armatures 2 and 14 are located on opposite sides of the magnet 1 and the pulls of the magnet thereon are in opposition.

Normally, when the armature 2 is in attracted position, as shown in Fig. 3, it forms a low reluctance path which shunts the armature 14 and the air gaps 16 between the magnet poles and armature 14.

However, when the thermomagnetic armature 2 becomes non-magnetic the reluctance thereof increases and becomes greater than that of armature 14 and the air gaps 16.

The pull of magnet 1 upon armature 14 will therefore predominate causing the yoke 9 to move in a clockwise direction on its supporting spindle 10.

Thus the movement of armature 14 toward the poles of magnet 1 and into attracted position causes armature 2 to move away from the magnet poles and out of attracted position.

The armature 14 when in attracted position, forms a low reluctance path which shunts the armature 2 and the air gaps between it and the magnet poles and prevents the automatic reattraction of armature 2 when it again becomes magnetic due to decrease in temperature thereof.

The stationary contact 3 is adjustably supported by the housing 5 and is insulated therefrom by a bushing 17. This contact 3 is adjustable from without the housing 5 and may be locked in adjusted position by lock nut 18. The outer end of contact screw 3 may serve as a terminal to which a conducting wire or lead may be connected.

The movable contact 4 is mounted upon a projection 19 of armature 14 and is insulated therefrom.

A conducting lead 20 for the movable contact extends through the opening in the housing 5, an insulating bushing 21 being provided for such opening.

For the purpose of manually restoring armature 2 to its attracted position, the yoke 9 may be provided with a lever or handle 22 extending through an opening 23 in the casing so that the relay may be reset from without the casing.

A flexible covering 24 for the opening 23 prevents dust and dirt from entering the controller housing 5.

The controller may be employed to protect a dynamo electric machine such as a motor aganist the destructive effect of high temperatures which may develop therein while the machine is in operation.

Thus the controller may be mounted upon the top of a frame 25 of a dynamo electric machine, as illustrated. The cup shaped housing 5 is provided with a flange 26 to receive bolts or screws 27 or other fastening means for fastening the controller housing to the frame of the machine.

When a dynamo electric machine is running, the temperature of the parts thereof increases due to the flow of current through the windings thereof. This temperature is a function of the current traversing the windings.

If the current is high the temperature may become so great as to be destructive to the insulation of the windings.

It therefore is advisable to provide means for stopping the operation of the machine when the temperature reaches a certain value and the controller herein described is particularly applicable for accomplishing this result.

In order that air may flow through the controller housing, the lower side of the flange 26 is provided with a plurality of depressions 28 forming air passages and the top of the casing may have an air outlet 28'.

Thus an increase in temperature in the frame of the machine increases the temperature of the air within the controller housing 5 and this heated air passing between the spaced thermomagnetic strips of armature 2 increases the temperature thereof.

If the temperature of the machine frame rises above the critical value, the temperature of the air in the controller housing and of the armature strips will accordingly increase.

When the temperature of the armature 2 increases to the critical value it becomes non-magnetic and the controller contacts 3 and 4 are disengaged by movement of the pivoted yoke 9 as previously explanied.

The controller contacts 3 and 4 may be connected in circuit of a compensator for an A. C. motor so as to stop the motor when the contacts open, as will more fully hereinafter appear.

Figs. 6 to 8 show a controller having a part of the frame thereof made of thermomagnetic material.

The controller has a U-shaped magnet frame having the legs 30 and 31 of magnetic material connected at one end by spaced strips 32 of thermomagnetic material. Each of the legs 30 and 31 may be a permanent magnet.

The strips 32 are spaced apart by fingers 33 projecting from lugs 34 by which the controller may be fastened to a support 38.

The controller has an armature 35 of magnetic material pivotally supported adjacent the free ends of the legs 30 and 31 of the magnetic frame at 38'.

The armature carries a contact 36 adapted to cooperate with a stationary contact 37 to control an external circuit.

The controller may be mounted in a housing such as described in connection with Figs. 1 to 5 or directly upon a part 38 of a machine the temperature of which controls the operation of the controller.

The strips or laminations 32, as illustrated, are in direct contact with the surface of the machine.

The distance between the armature and the pole faces may be adjusted and maintained by an adjusting screw 39.

If the thermomagnetic strips 32 forming a part of the magnetic frame are made of material such as nickel steel or Monel metal, the armature 35 will be attracted normally so as to maintain the contacts 36 and 37 in engagement.

When the temperature of the thermomagnetic strips increases to the critical value, the strips become nonmagnetic and the armature is released, disengaging the contacts.

If the strips 32 be made of material such as cobalt steel, the armature will be retracted normally, and when the temperature of the strips increases to the critical value the armature will be attracted causing the engagement of the contacts.

Either a permanent or an electromagnet may be used. If an electromagnet is used, it may be energized from the circuit which it is protecting, so that failure of voltage will break the circuit.

Figs. 9 to 11 show a controller wherein a thermomagnetic bridge connecting the free ends of the magnet frame is in parallel with the armature.

This controller has a U-shaped magnet frame 40 and an armature 41 pivotally mounted adjacent the ends thereof, at 41'.

The magnet frame 40 is provided with an energizing winding 42 which may be supplied with current from any suitable source.

The armature carries a contact 43 adapted to co-operate with a stationary contact 44 to control an external circuit.

A plurality of spaced thermomagnetic strips 45 forms a bridge between the free ends of the legs of the magnet frame 40. The ends of these strips 45 are connected to the legs of the magnet frame 40 near the free ends thereof and are spaced apart by fingers 46 of lugs 47 by which the controller may be mounted on a suitable support.

An adjusting screw 48 supported by the strips 45 cooperates with the armature 41 so that the minimum distance between the armature and the pole faces of the magnet frame 40 may be varied.

The controller may be mounted in a housing similar to that described in connection with Figs. 1 to 5, or directly upon a part 49 of a machine the temperature of which controls the operation of the controller.

The strips or laminations 45, as illustrated, are in direct contact with the surface of the machine.

If it is desired to maintain the contacts 43 and 44 normally in engagement, the thermomagnetic strips may be made of material such as cobalt. Thus when the temperature of such cobalt steel strips is below the critical value the strips are nonmagnetic, so the armature is held in attracted position.

However, when the temperature rises to the critical value, the thermomagnetic strips 45 of cobalt become magnetic and shunt the lines of force from the armature 41 so that it releases, disengaging the contacts.

If the strips 45 be made of material such as nickel steel or Monel metal, the armature would not be attracted until the temperature of the strips increased to or above the critical value.

The magnet frame of any of the controllers described herein may be a permanent magnet or may be provided with an energizing winding.

Figure 12:
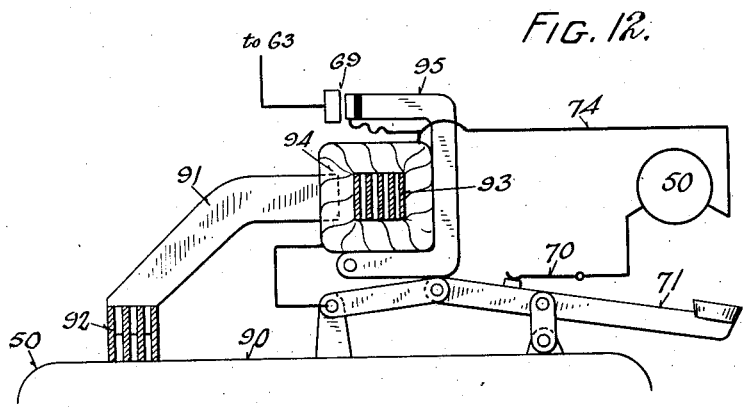
Fig. 12 shows diagrammatically a motor controlling apparatus with a thermal controller which is sensitive to the heat from the motor, and which is sensitive to an overload in the current.

Fig. 12 shows a thermal controller which is sensitive not only to the heat of the motor, but is also sensitive to an overload in the current of the circuit.

In this figure, 90 indicates the top of the motor 50 to be protected. 91 indicates a U-shaped frame of magnetic material. 92 indicates a base of thermomagnetic material for the U-shaped frame 91. The electromagnet comprises a core of thermomagnetic material 93 and a coil 94.

The electromagnet 93 is mounted on the swinging frame 95 which may contact at 69 with the line leading to a low voltage release (not shown).

The controller is provided with toggle mechanism 71 to operate a switch 70 which controls the motor 50.

If the motor should become overheated, thermomagnetic material 92 becomes nonmagnetic, thus breaking the magnetic circuit and allowing the frame 95 to drop on toggle 71, opening switch 70 and contact 69.

The opening of contact 69 deenergizes a low voltage release and stops the motor.

In order to make the low voltage release operative again, it is necessary for the operator to reset toggle 71 to hold coil 93 near the frame 91 but not quite closing contact 69.

If the motor remains overheated, the contact 69 will not close when the compensator is operated because the magnetic circuit in the controller is open at heat sensitive material 92.

Thus the compensator handle is not retained in operating position by the low voltage release while the motor is overheated. This thermal controller thus protects the motor from being operated while overheated.

The thermal controller also protects the motor from an overload in current by means of coil 94.

The overload in the current heats the coil 94 and the thermomagnetic material 93, thus opening the magnetic circuit of the controller. The frame 95 then falls on toggle 71 and opens contact 69 and an auxiliary circuit 74 which includes one terminal of the motor 50, coil 94, toggle 71 and switch 70.

In order to make the compensator remain in operating position, it is first necessary to reset the toggle 71 and to allow the coil 94 to cool sufficiently so that the thermomagnetic material 93 will close the magnetic circuit of the thermal controller and cause the contact 69 to render the low voltage release operative to hold the compensator handle in operating position.

Figure 13:
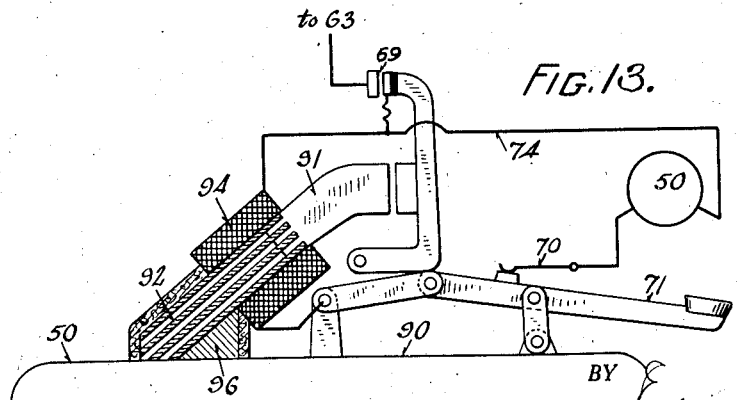
Fig. 13 shows diagrammatically motor controlling apparatus similar to that shown in Figure 12 with a different modification of thermal controller.

Fig. 13 shows a modification of an electromagnetic thermal controller similar to the one shown in Fig. 12 except that the coil 94 is mounted on the U-shaped magnet frame instead of on the swinging frame 95.

The base of the U-shaped magnetic frame 91 may be composed of thermomagnetic material 92 which may extend into the coil 94. The base 92 may also have heat conducting material 96 such as brass for aiding in conducting the heat from the top 90 of the motor 50 to the heat sensitive material 92.

It will thus be seen that heat from the top 90 of motor 50 opens the magnetic circuit and that heat from the coil 94 also opens the magnetic circuit.

Auxiliary circuit 74 may start from one terminal of the motor 50 through coil 94, toggle 71, switch 70 and back to another terminal of the motor 50.

The overload in the current heats the thermomagnetic material in coil 94 and an overloading of the motor heats the thermomagnetic material at 92.

In either case, the contact 69 is opened when the thermomagnetic material 92 is heated and the low voltage release is thus rendered inoperative to hold the compensator handle in operating position.

The invention contained herein is, of course, susceptible of other embodiments and adaptations.

The invention claimed is:

1. A controller comprising a magnet, two armatures therefor so positioned with respect thereto that the attraction upon them is in opposition, one of said armatures being of magnetic material and the other of thermo-magnetic material, the attraction of the thermo-magnetic armature predominating when the temperature thereof is below a certain value, the magnet and armatures being relatively movable, and electric contacts controlled by said relative movement.

2. A controller comprising a magnet, an armature movable relatively thereto and normally forming therewith a magnetic circuit having thermomagnetic material connected therein and adapted upon a change in the temperature thereof to alter said magnetic circuit and permit said armature to move away from said magnet, means automatically to prevent said armature from returning to its normal position, and a switch controlled by said armature.

3. A controller comprising a magnet, an armature movable relatively thereto and normally forming therewith a magnetic circuit having thermomagnetic material connected therein and adapted upon a change in the temperature thereof to alter said magnetic circuit and permit said armature to move away from said magnet, magnetic means to prevent said armature from returning automatically to its normal position, and a switch controlled by said armature.

4. A controller comprising a magnet, an armature movable relatively thereto and normally forming therewith a magnetic circuit having spaced laminations of thermomagnetic material connected therein and adapted upon a change in the temperature thereof to alter said magnetic circuit and permit said armature to move away from said magnet, means to prevent said armature from returning automatically to its normal position, and a switch controlled by said armature.

5. A controller, comprising a magnet, an armature movable relatively thereto and forming therewith a magnetic circuit having thermomagnetic material connected therein and adapted upon a change in the temperature thereof to alter said magnetic circuit and thereby enable said armature and said magnet to separate, an electric switch operable by the separation of said magnet and said armature, a frame supporting said magnet, armature, and switch and attachable to an electric apparatus for exposing said thermomagnetic material to heat generated by said apparatus.

6. A controller, comprising a magnet, an armature movable relatively thereto and forming therewith a magnetic circuit having thermomagnetic material connected therein and adapted upon a change in the temperature thereof to alter said magnetic circuit and thereby enable said armature and said magnet to separate, an electric switch operable by the separation of said magnet and said armature, and a casing enclosing said magnet, armature, and switch and attachable to an electric apparatus for directing heat generated thereby against said thermomagnetic material.

7. A controller, comprising a magnet, an armature movable relatively thereto and forming therewith a magnetic circuit having thermomagnetic material connected therein and adapted upon a change in the temperature thereof to alter said magnetic circuit and thereby enable said armature and said magnet to separate, an electric switch operable by the separation of said magnet and said armature, and casing having an open bottom and enclosing said magnet, armature and switch and attachable to an electric apparatus for directing heat generated thereby against said thermomagnetic material.

8. A controller, comprising a magnet, an armature movable relatively thereto and forming therewith a magnetic circuit having thermomagnetic material connected therein and adapted upon a change in the temperature thereof to alter said magnetic circuit and thereby enable said armature to move away from said magnet, an electric switch controlled by said armature, and a casing enclosing said magnet, armature, and switch and attachable to an electric apparatus for directing heat generated thereby against said thermomagnetic material.

9. A controller, comprising a magnet, an armature movable relatively thereto and forming therewith a magnetic circuit having thermomagnetic material connected therein and adapted upon a change in the temperature thereof to alter said magnetic circuit and thereby enable said armature to move away from said magnet, an electric switch controlled by said armature, a frame supporting said magnet, armature and switch and attachable to an electric apparatus for exposing said thermomagnetic material to heat generated by said apparatus, and means to prevent said armature from returning automatically to its normal position.

10. A controller, comprising a magnet, an armature movable relatively thereto and forming therewith a magnetic circuit having thermomagnetic material connected therein and adapted upon a change in the temperature thereof to alter said magnetic circuit and thereby enable said armature to move away from said magnet, an electric switch controlled by said armature, a casing enclosing said magnet, armature and switch and attachable to an electric apparatus for directing heat generated thereby against said thermomagnetic material, and means to prevent said armature from returning automatically to its normal position.

11. A controller, comprising a magnet, an armature normally arranged in the magnetic circuit thereof and formed of thermomagnetic material capable of losing its magnetic quality upon a change in the temperature thereof and thereby enable said armature to move away from said magnet after said change in temperature occurs, an electric switch controlled by said armature, and means to prevent said armature from returning automatically to its normal position.

12. A controller, comprising a magnet, an armature normally arranged in the magnetic circuit thereof and formed of thermomagnetic material capable of losing its magnetic quality upon a change in the temperature thereof and thereby enable said armature to move away from said magnet after said change in temperature occurs, an electric switch controlled by said armature, and a casing enclosing said magnet armature and switch and attachable to an electric apparatus for directing heat generated thereby against said thermomagnetic material.

13. A controller, comprising a magnet, an armature normally arranged in the magnetic circuit thereof and formed of thermomagnetic material capable of losing its magnetic quality upon a change in the temperature thereof and thereby enable said armature to move away from said magnet after said change in temperature occurs, an electric switch controlled by said armature, a casing enclosing said magnet, armature and switch and attachable to an electric apparatus for directing heat generated thereby against said thermomagnetic material, and means to prevent said armature from returning automatically to its normal position.

14. A controller, comprising a switch having a movable contact, a magnetic actuator having thermomagnetic material connected in its magnetic circuit and arranged to move said movable contact from an initial position in response to a change in the magnetic reluctance of said circuit when said thermomagnetic material is heated to a predetermined temperature, and means arranged to prevent automatic return movement of said movable contact to its initial position.

JOHN M. BARR.